United States Patent [19]
Lin et al.

[11] Patent Number: 5,233,885
[45] Date of Patent: Aug. 10, 1993

[54] AXLE STRUCTURE FOR BICYCLES

[76] Inventors: Jin-Chen Lin, #173 Kuei Suei Street, San Ming Dist.; Ming-Chang Lin, #66, Huai An Street, San Ming Dist., both of Kaohsiung, Taiwan

[21] Appl. No.: 898,820
[22] Filed: Jun. 15, 1992
[51] Int. Cl.⁵ .................. G05G 1/14; F16C 19/50
[52] U.S. Cl. .................. 74/594.1; 384/545; 384/512
[58] Field of Search .......... 74/594.1-594.4; 384/545, 512, 513; 301/124 R, 105 R

[56] References Cited

U.S. PATENT DOCUMENTS

| | | | |
|---|---|---|---|
| 616,094 | 12/1898 | Farnell | 384/545 |
| 4,594,910 | 6/1986 | Nagano | 74/594.1 |
| 4,738,551 | 4/1988 | Chi | 384/545 X |
| 4,810,040 | 3/1989 | Chi | 301/124 R X |
| 4,905,803 | 3/1990 | Boyd | 74/594.1 X |
| 5,106,210 | 4/1992 | Chi | 384/545 X |
| 5,118,205 | 6/1992 | Hoffmann | 384/545 X |

FOREIGN PATENT DOCUMENTS

| | | | |
|---|---|---|---|
| 3821051 | 12/1989 | Fed. Rep. of Germany | 384/512 |
| 1244336 | 9/1960 | France | 384/512 |
| 2355202 | 1/1978 | France | 384/545 |
| 1-180393 | 12/1989 | Japan | 74/594.1 |
| 2169040 | 7/1986 | United Kingdom | 384/512 |

*Primary Examiner*—Vinh T. Luong
*Attorney, Agent, or Firm*—Bacon & Thomas

[57] ABSTRACT

An axle structure for driving a bicycle includes an axle rotatably mounted in an axle housing which is rigidly connected within a shell to transfer forces received from a pair of cranks to a driven chain wheel to drive the bicycle forward.

6 Claims, 15 Drawing Sheets

PRIOR ART
FIG.6F

AXLE STRUCTURE FOR BICYCLES

FIELD OF THE INVENTION

This invention relates to an axle structure for a bicycle. More particularly, an axle structure adapted to be rotatably installed in a shell to drive the bicycle forward by two driving cranks rigidly mounted at respective side thereof.

RELATED PRIOR ART

A bicycle axle is a major driving part to a bicycle since it transfers the force received from two cranks to a driving wheel which then drives the bicycle.

Figure 4:
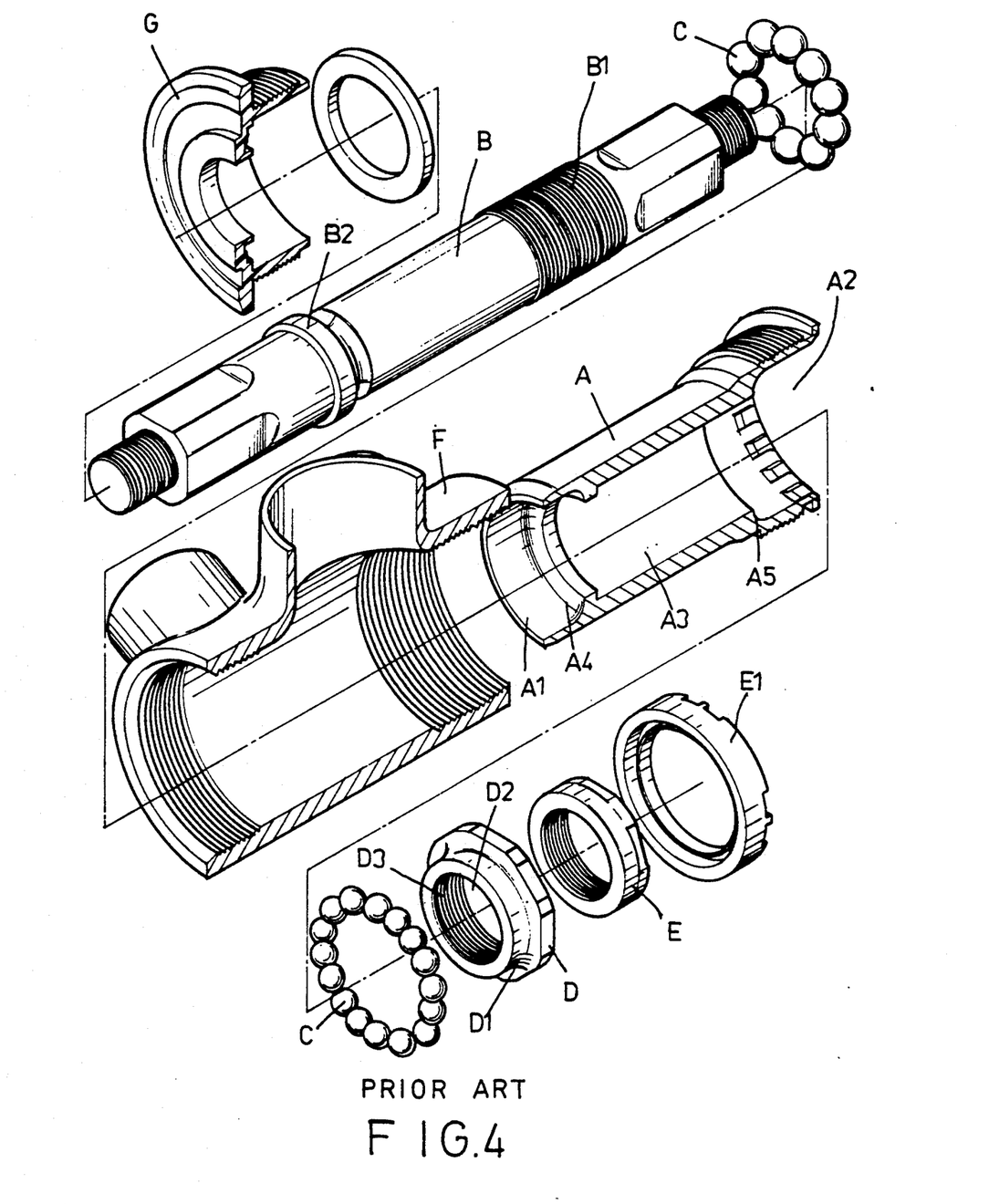
FIG. 4 is an exploded view of a prior art axle structure.
Figure 5:
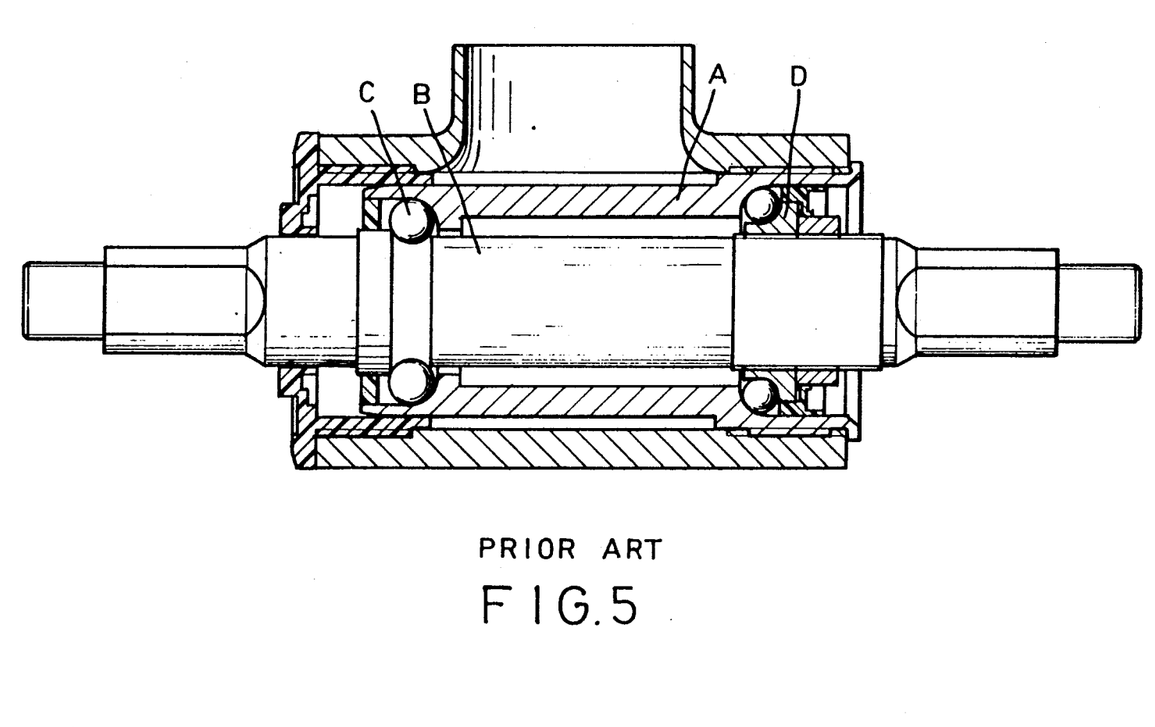
FIG. 5 is an elevational side view of the axle structure of FIG. 4, partially sectioned.

A bicycle axle according to the prior art, as shown in FIG. 4, comprises a longitudinal axle B, an axle housing A, and a so called B. B. shell F. The axle housing A has two openings A1, A2 at opposite ends, and a passage A3 along its axis adapted to receive the axle B therein. The opening A2 has a larger inner diameter than the diameter of opening A1. The passage A3 has the smallest inner diameter with respect to the inner diameter of the two openings A1, A2 thereby forming two seats A4, A5 adjacent between openings A1, A2 adapted for bearings to rest thereon The axle B includes a threaded portion B1 close to one end and a flange B2 at an opposite end. A socket is formed at the adjacent area between the flange B2 and the axle B itself for receiving a bearing. The shell F, which is cylindrical in shape, has at least five outlets and a passage along its axis with internal threaded portions at respective ends of the passage.

Figure 6A:
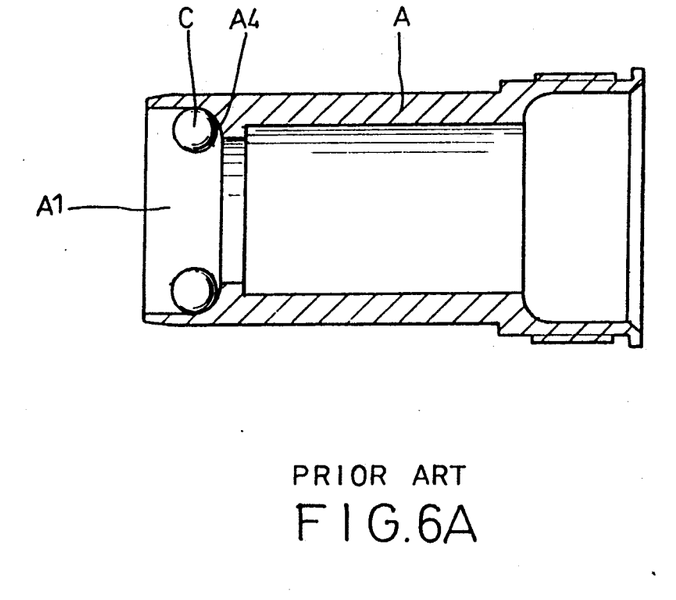
FIGS. 6A, 6B, 6C, 6D, 6E, 6F are elevational side views of the axle structure of FIG. 4 showing various installation steps.
Figure 6B:
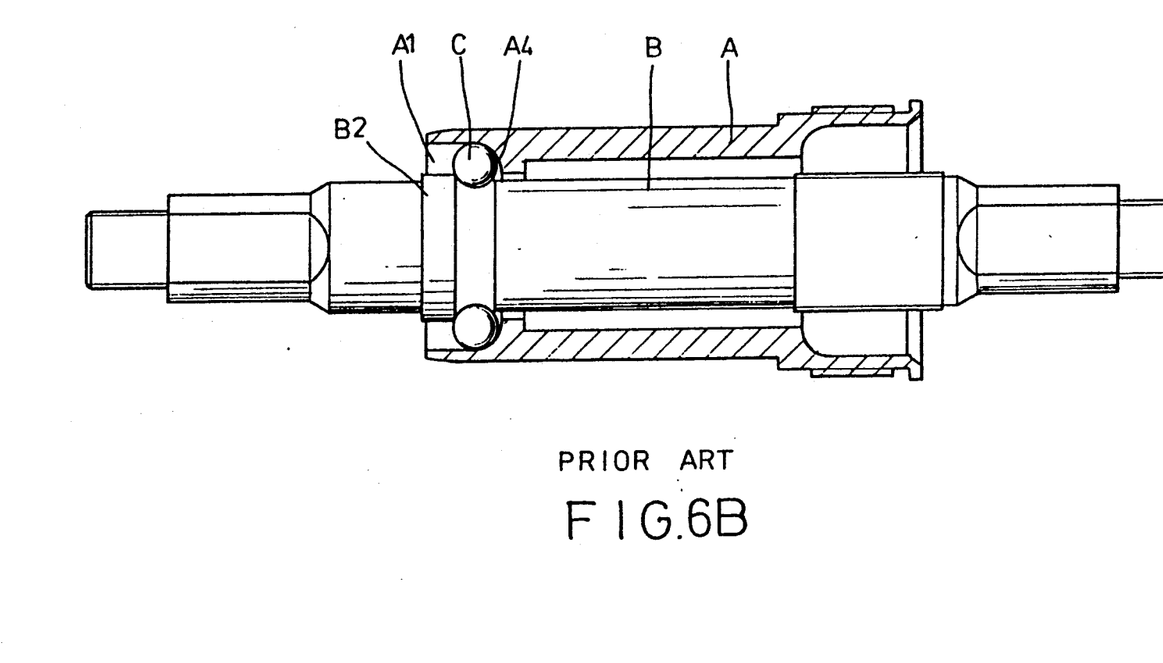
Figure 6C:
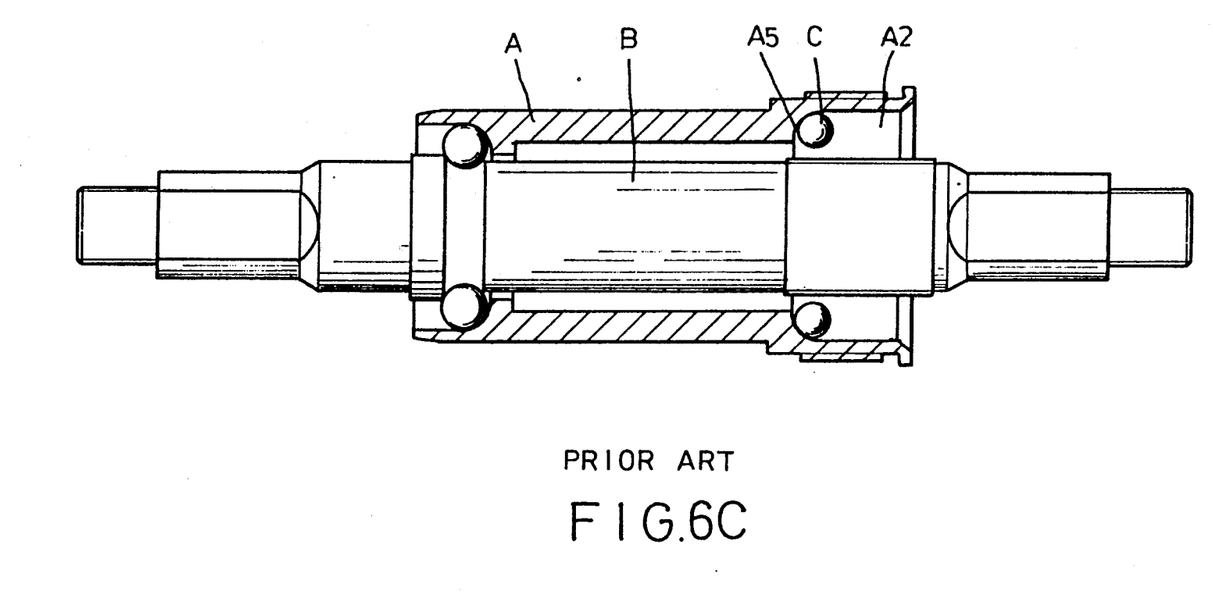
Figure 6D:
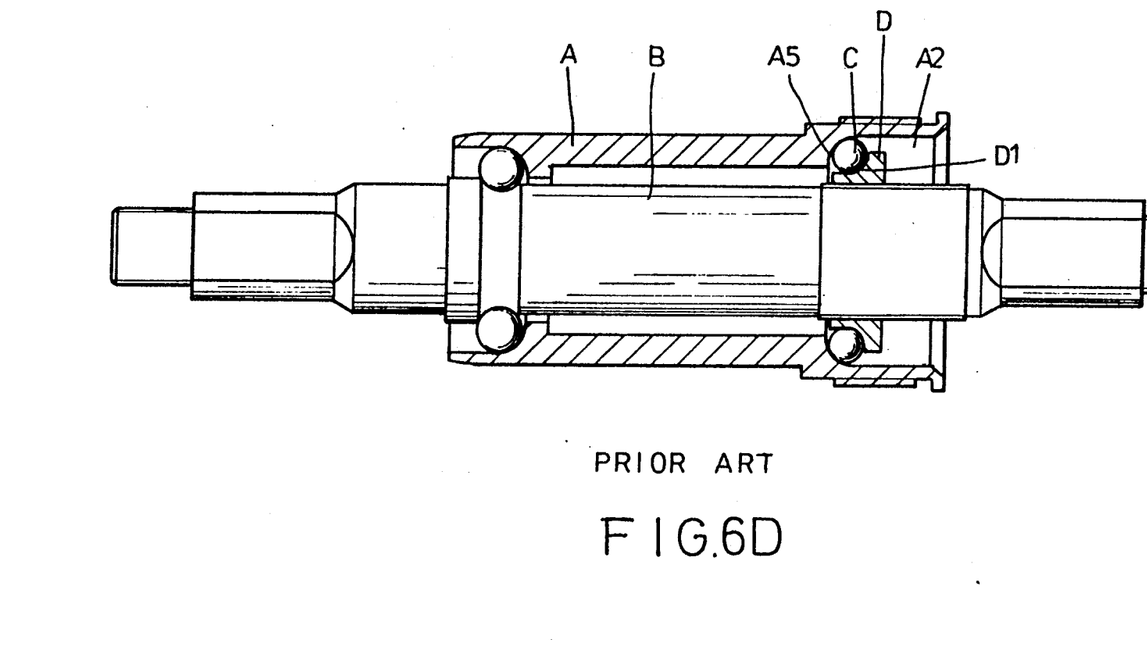
Figure 6E:
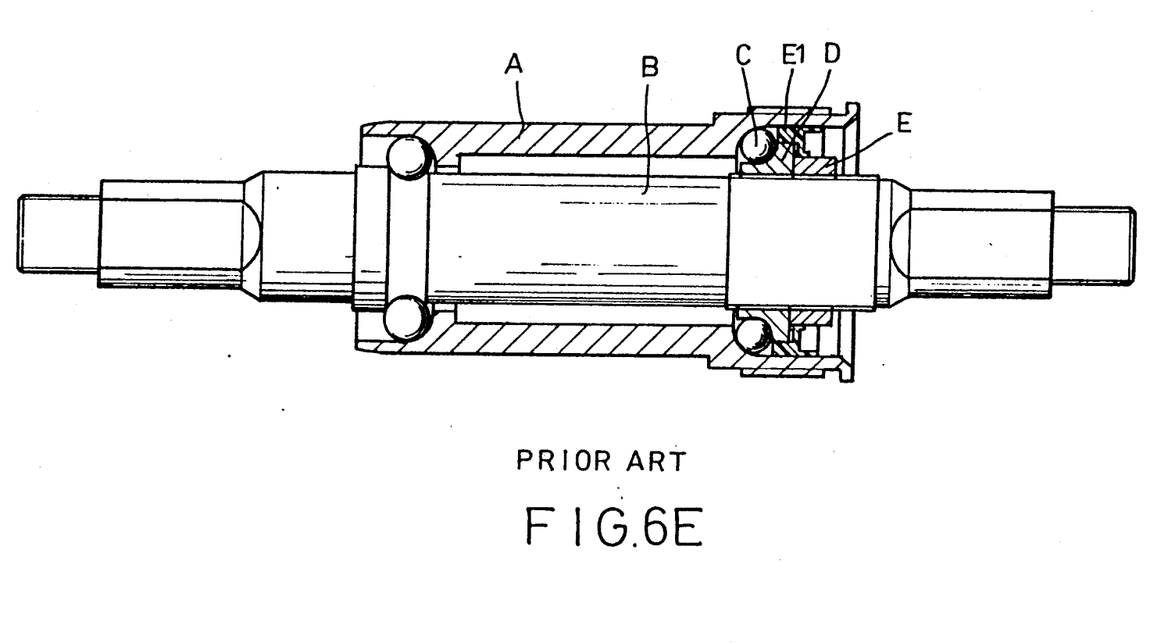
Figure 6F:
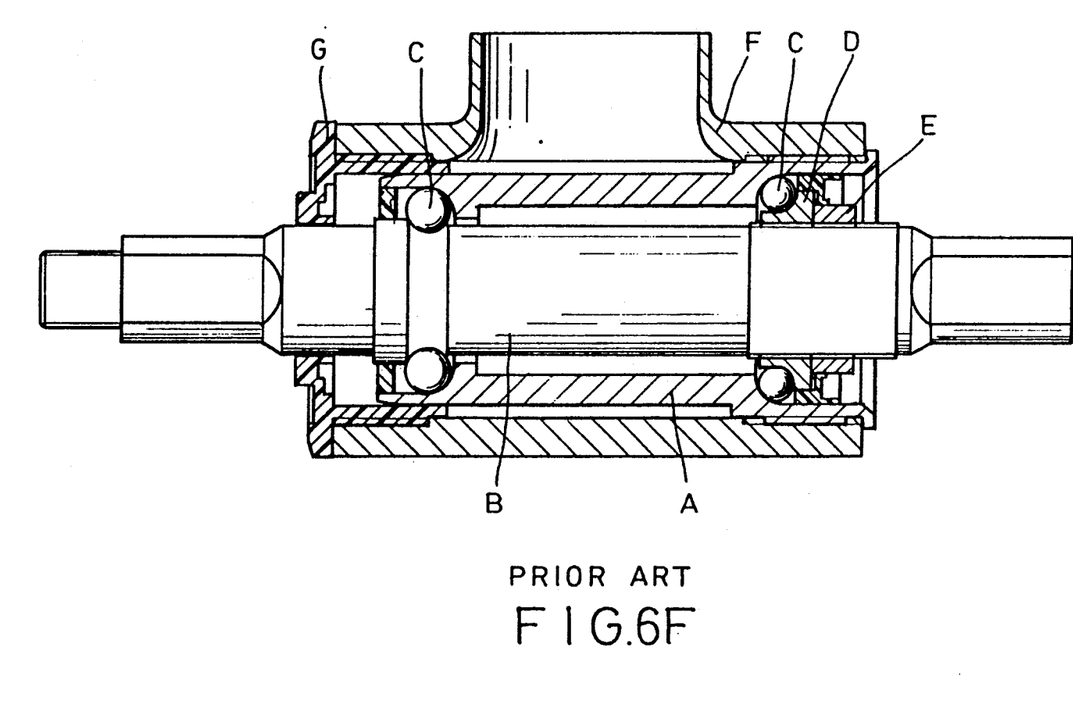

To assemble, please refer to FIG. 6A, steel balls C are placed around the seat A4 and applied with grease, then axle B is inserted into the housing A allowing balls C to seat on the socket of the housing A, as shown in FIG. 6B. The seat A5 is also arranged with a number of steel balls C seated thereon, subsequently, as shown in FIG. 6C, which are held in place by an adjusting cup D threaded onto the threads B1, as shown in FIG. 6D. Nut E and packing E1 are then threaded onto the threaded portion B1 subsequently, as shown in FIG. 6E. The force between the bearing balls C and the adjusting cup D should be adjusted (i.e. tightened) before the housing A is inserted into the shell F and then a nut G is rigidly threaded to shell F as shown in FIG. 6F.

A few shortcomings arise therefrom: When installing steel balls C, caution must be taken to prevent balls C from falling; further, the axle B may also obstruct the installation of bearings C. Another shortcoming is that water may penetrate into the shell F and cause oxidation of the housing A, Axle B, and other parts located in the shell F.

The inventor, in view of these shortcomings, has invented the present invention.

SUMMARY OF THE INVENTION

It is the primary object of the present invention to provide an axle structure for bicycles which is easy to install.

It is another object of the present invention to provide an axle structure for bicycles which is easy to adjust when wear occurs.

It is a further object of the present invention to provide an axle structure for bicycles which has a drainage to drain out water thereby preventing oxidation from occurring.

DETAILED DESCRIPTION OF THE PREFERRED EMBODIMENT

Figure 1:
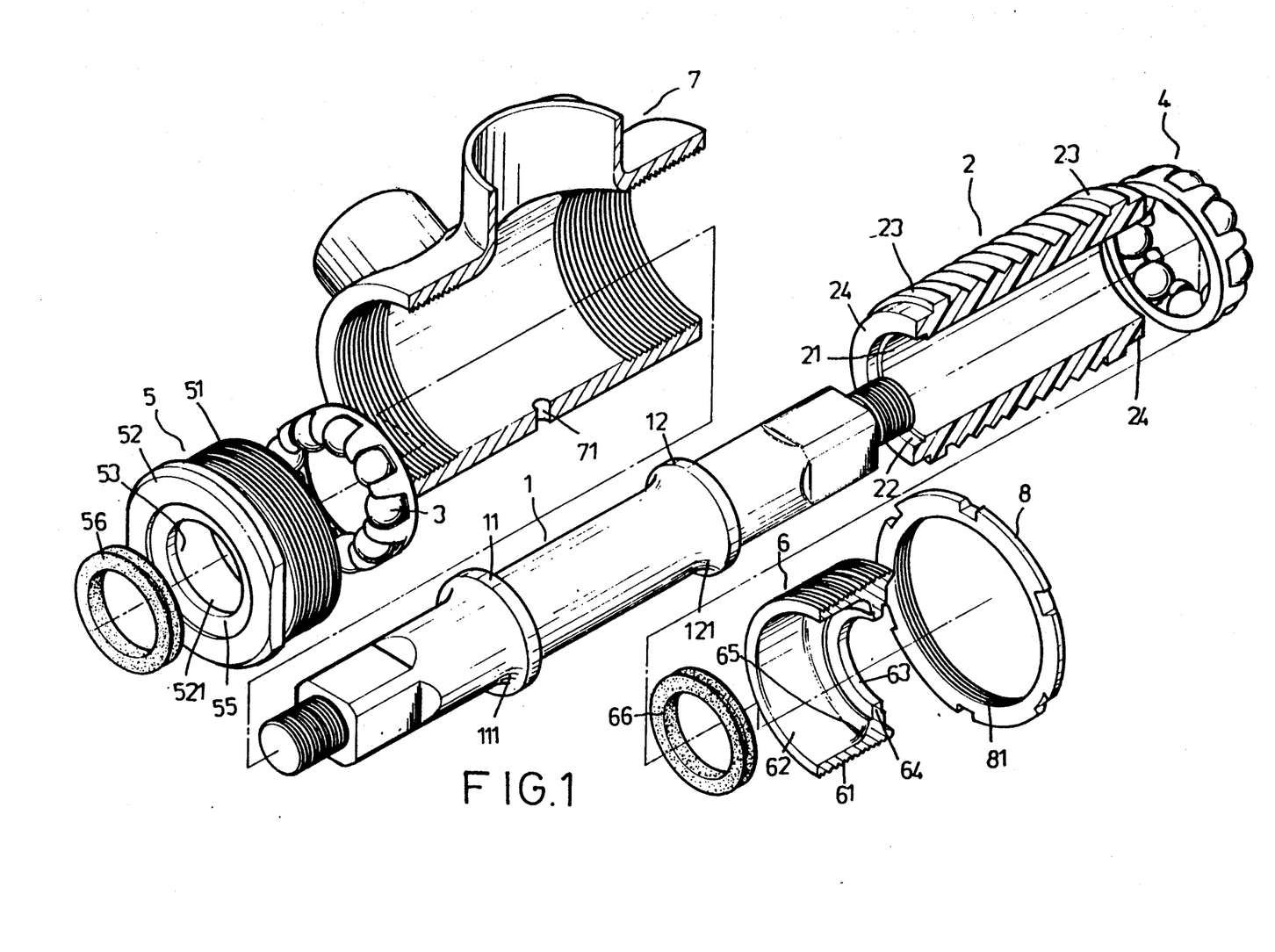
FIG. 1 is an exploded view of a first embodiment of the present invention.

Reference is now made to the drawings wherein the showings are for the purpose of illustrating preferred embodiments of the invention only and not for the purpose of limiting the same. FIG. 1 shows the present invention composed of an axle 1, an axle housing 2, a pair of bearings 3, 4, a flanged cup 5, an adjusting cup 6, a shell 7, and a retainer ring 8. The axle 1 includes two flanges 11, 12 at opposite portions thereof. The diameter of flange 11 is larger with respect to the diameter of the flange 12.

Figure 1A:
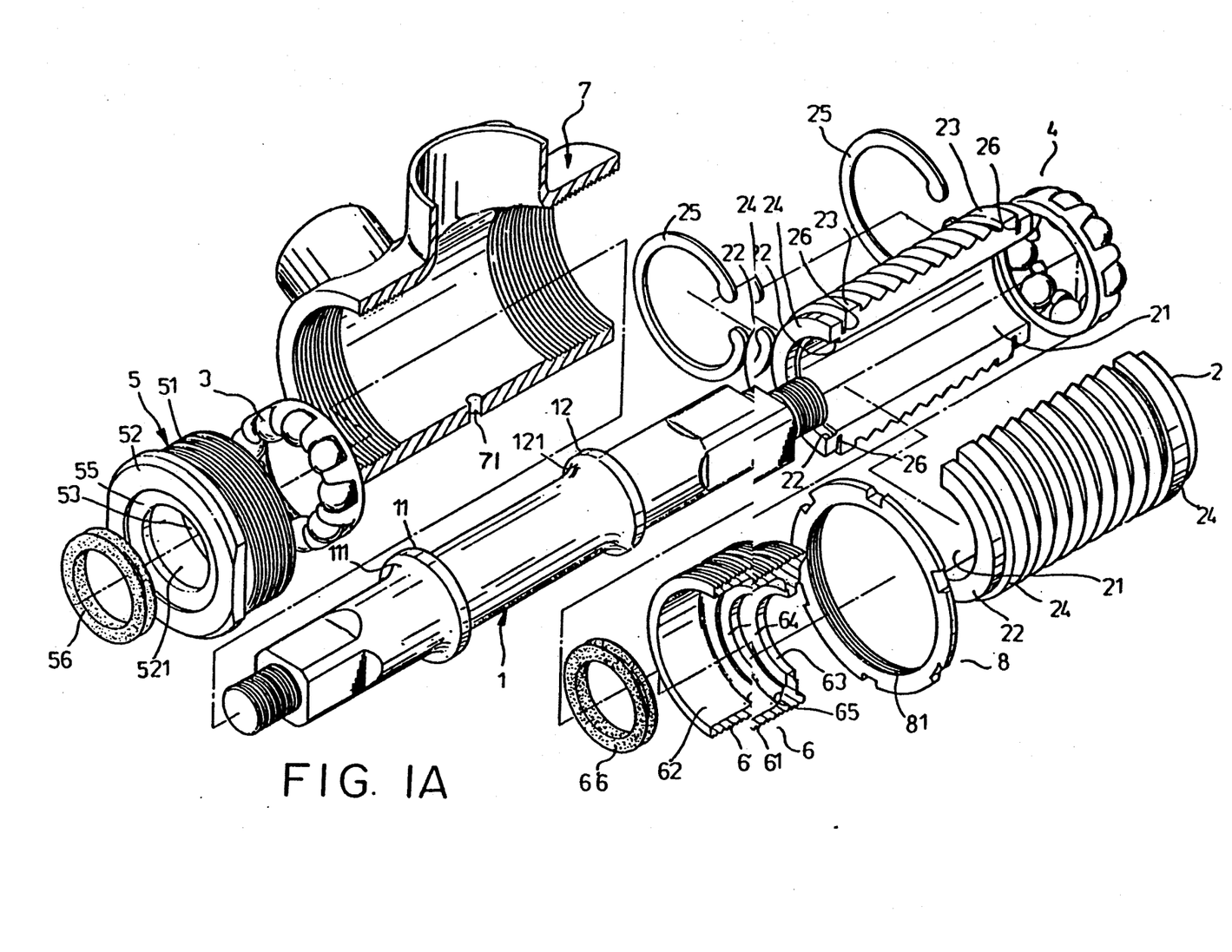
FIG. 1A is an exploded view of a second embodiment of the present invention.

The axle housing 2 is cylindrical in shape and has a passage 21 along its axis adapted to receive the axle 1, a cut off portion 22 at an inner end defines a blocking area, and a plurality of ring protrusions 23 in cross section along the outer surface so as to define two engaging areas 24 at respective ends and a number of channels in between every two protrusions 23 to guide water to drip to the bottom portion thereof. The engaging areas 24 are so arranged that the outer diameters of which are dimensionally equal to the inner diameters of the flange cup 5 and of the adjusting cup 6 respectively to facilitate engagement thereon. The passage 21 is made in such a manner that the inner diameter is gradually enlarged from one end to the other. The axle housing 2 may be formed of two half-shell pieces as shown in FIG. 1A, which are connected together by means of two clamps 25 clamping into grooves 26 at respective ends of each half shell.

Figure 2:
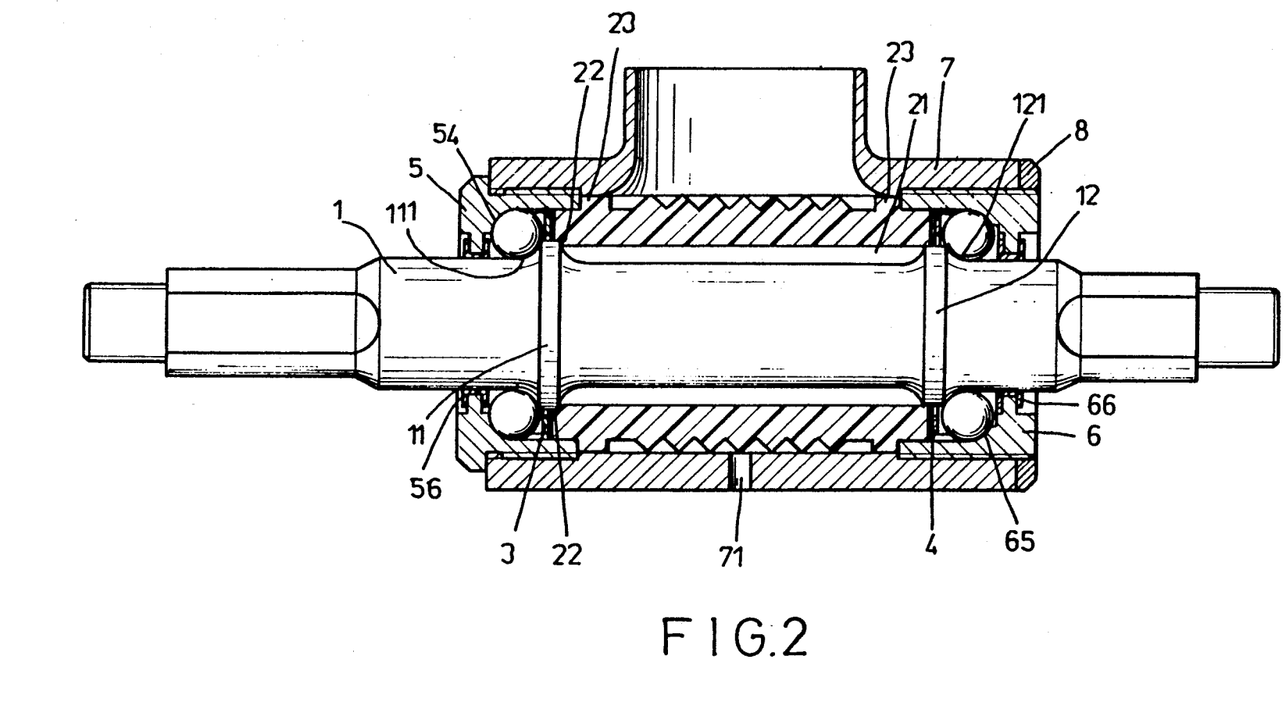
FIG. 2 is an elevational side view of FIG. 1, partially sectioned.

The flanged cup 5 has a threaded portion 51 for threaded engagement with the shell 7 and includes a passage 53 extending along its axis, a flange 52 at an opposite end having an opening 521 concentric with the passage 53, which has a diameter slightly larger than the diameter of the axle 1 and includes a cut-off portion 55 around the opening to receive a washer 56. A socket 54, as shown in FIG. 2, is defined in the flanged cup 5 at the adjacent area between inner walls of the passage 53 and the flange cup 5 itself and is adapted to receive bearing 3.

The adjusting cup 6, which is shaped like a barrel, has threads 61 on its outer surface and a passage 62 along its axis having an internally extending portion at one end formed with a smaller diameter than the diameter of the passage 62 so as to define an opening 63. The opening 63 has a diameter dimensionally smaller then the diameter of the passage 62 so as to define an opening 63. The opening 63 has a diameter dimensionally smaller than the diameter of the passage 62 and a circular cut-off portion 65 thereof to receive a washer 66 thereon.

The shell 7 is made of the same as in the prior art, as shown in FIGS. 4, 5, 6A through 6F with a minor but an important improvement, that is, a drainage 71 at bottom portion to drain out water which may penetrate into the shell 7 so as to eliminate the possibility of oxidation reaction.

It is to be noted that the surfaces 111 and 121 which receive bearings 3, 4 thereon are arcuated for a better engagement.

Figure 3A:
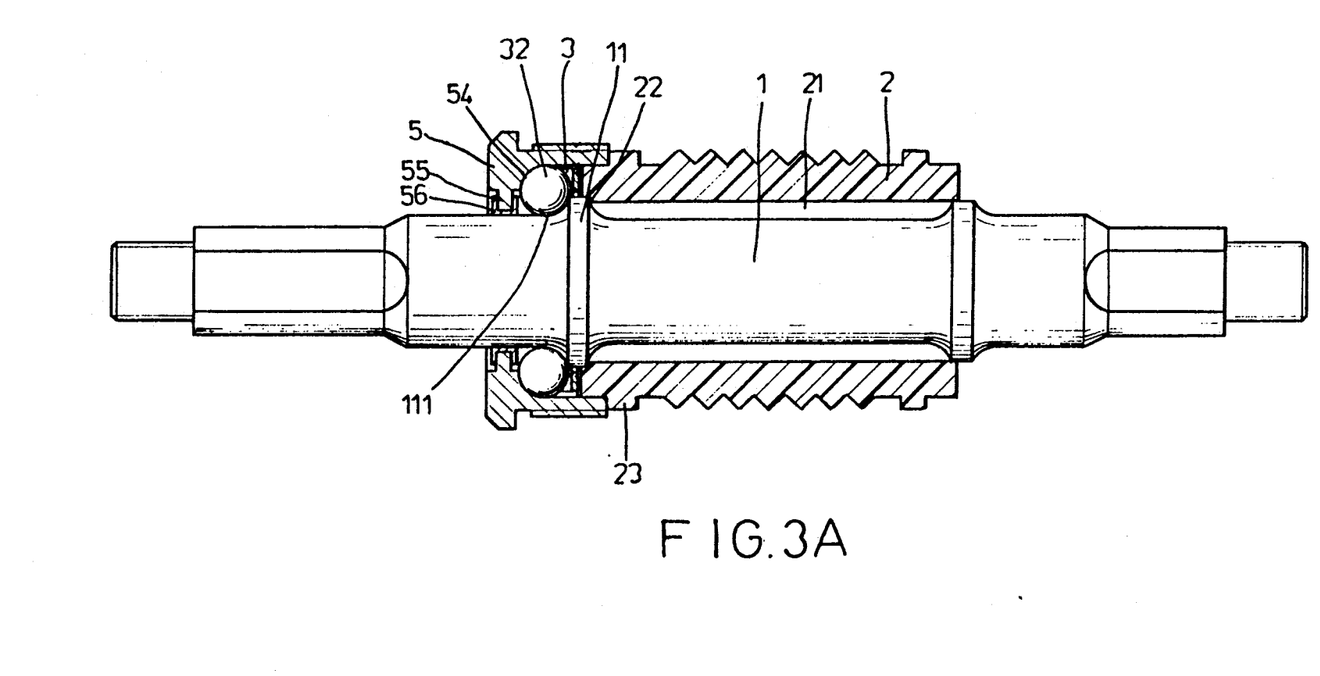
FIGS. 3A, 3B, 3C, 3D are elevational side views of the FIG. 1 embodiment showing various installation steps.
Figure 3B:
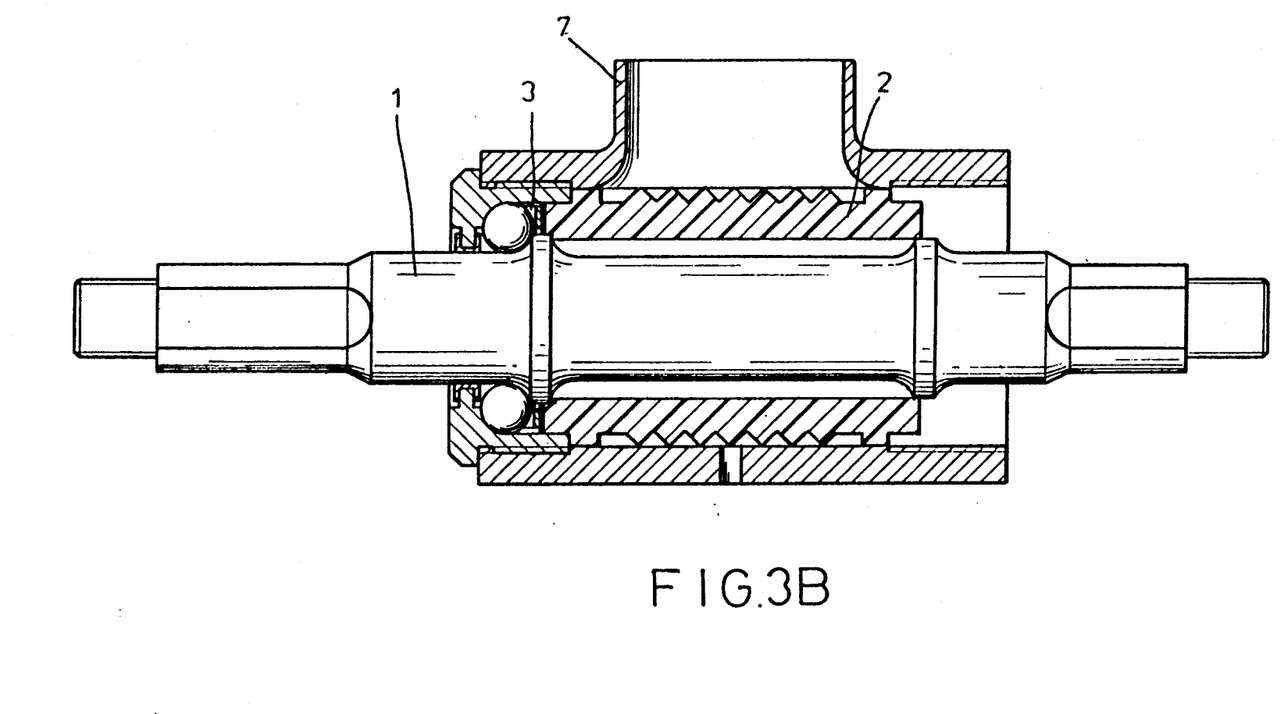
Figure 3C:
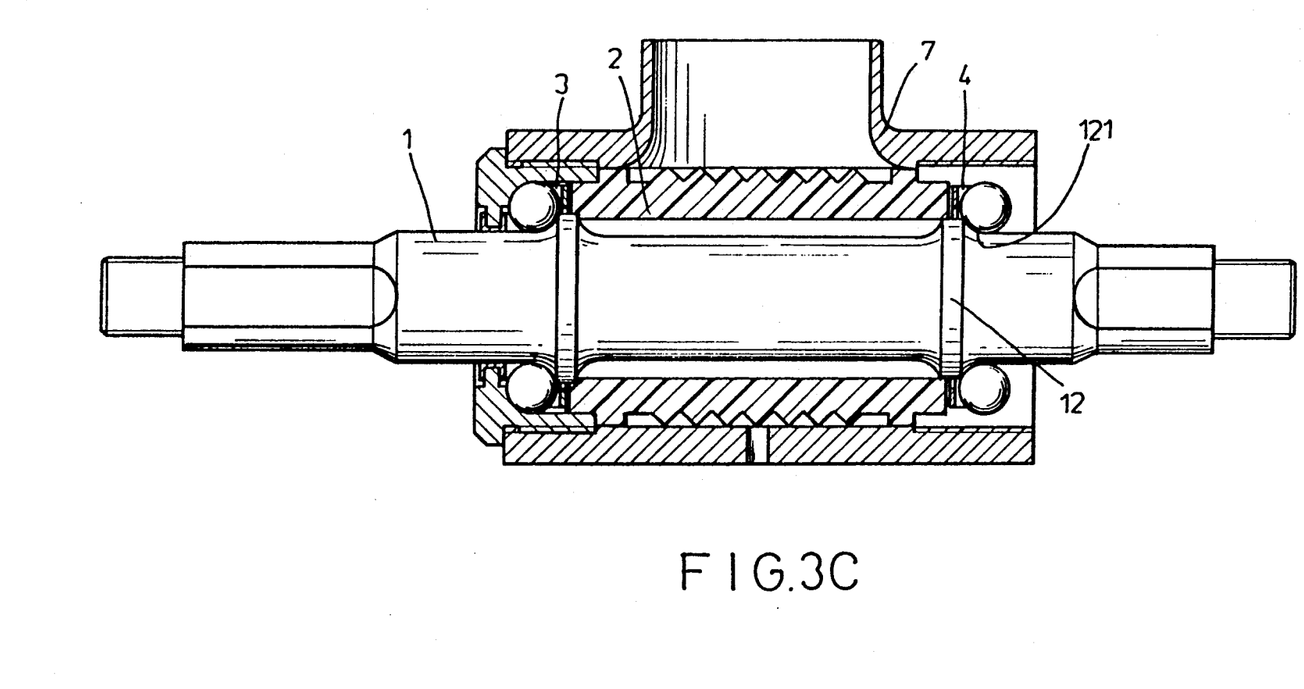
Figure 3D:
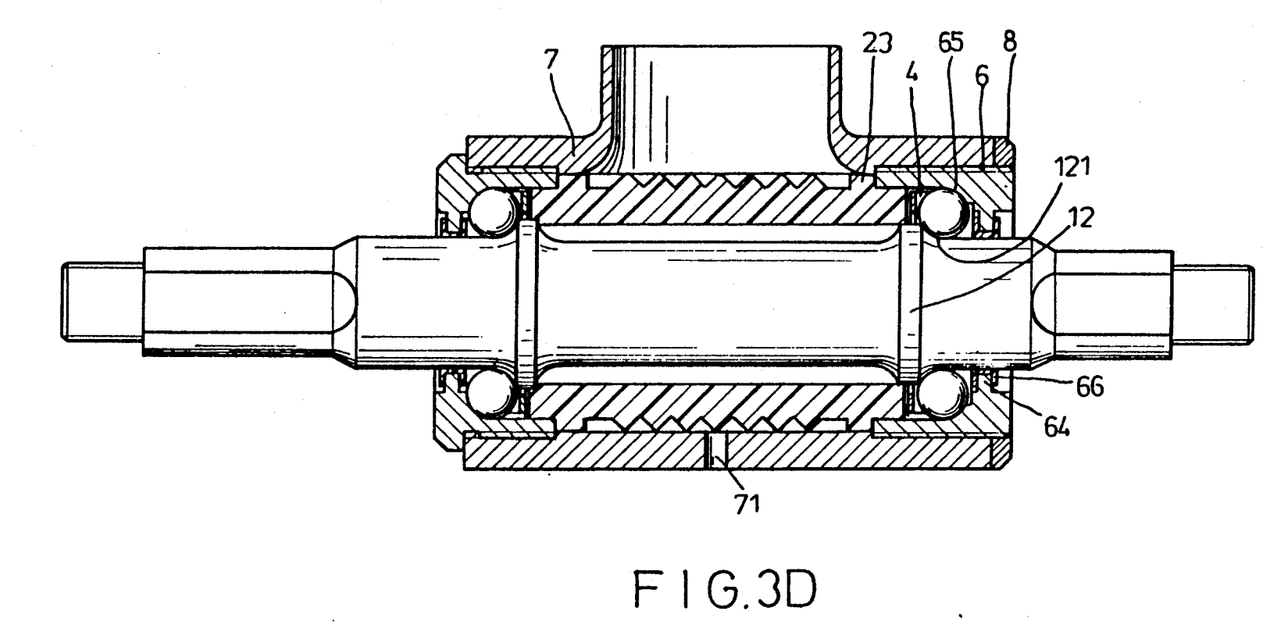

Assembly of the axle structure according to the present invention is as follows: first place bearing 3 in the flanged cup 5 with the balls facing the inner end of the cup 5, as shown in FIG. 3A, and insert the axle 1 into the housing 2 such that the flange 12 faces forward, thus the forward movement will be stopped when flange 11 is encountered and blocked by the blocking area 22. Sleeve the flanged cup 5 onto the axle 1 from the flange 11 end until the inner edge of the flange cup 5 slips onto the engaging area 24 and is stopped by the first protrusion 23 encountered, thus the flanged cup 5 is detachably connected to the housing 2. The assembly sleeves into and is threadedly connected to the shell 7 by means of the outer threads 51 of the flanged cup 5 and the internal threads of the shell 7, as shown in FIG. 3B. The other bearing 4 then sleeves on the axle 1 and rests on outer portion 121 of the flange 12, as shown in FIG. 3C. Following mounting the bearing 4, the adjusting cup 6 is sleeved on the axle 1 with the inner edge being slipped onto the engaging area 24 and threadedly connected with the internal threads of the shell 7. The retainer ring 8 is then able to be threaded onto the adjusting cup 6 and the installation is completed thereafter.

According to the above disclosure, the present invention includes a number of merits, one of which is that if adjustment due to wear and tear is required, the adjustment can be done by adjusting the adjusting cup 6 without disassembling the axle 1 from the shell 7.

I claim:

1. An axle structure for bicycles comprising:
   a longitudinal axis having first and second longitudinally spaced flanges, one of said flanges having an outer diameter larger than the outer diameter of the other flange;
   a cylindrical housing having a longitudinal passage for receiving said axle therein, an inner cut-off portion at one inner end of said cylindrical housing being adapted to abut and hold said one flange of said axle in a predetermined position therein, and a number of ring protrusions on an outer surface of said cylindrical housing, said ring protrusions defining first and second longitudinally spaced engaging areas;
   a flanged cup having an outer threaded portion at one end, a passage along its axis, and a flange at the other end having an opening concentric with said passage, said flanged cup being adapted to engage said first engaging area;
   an adjusting cup shaped like a barrel having an external threaded portion, a passage along its axis, and an opening concentric with said passage, said adjusting cup being adapted to engage said second engaging area;
   a cylindrical shell adapted to receive said axle and said cylindrical housing therein, said cylindrical shell having a plurality of outlets thereon, a passage along its axis, two internally threaded portions at respective ends adapted for threaded connection with said flange cup and said adjusting cup, and a drainage at a bottom portion thereof;
   a retainer ring having an internal threaded portion adapted to be threadedly connected with said adjusting cup to prevent the threaded connection of said adjusting cup with said cylindrical shell from loosening.

2. The axle structure for bicycles of claim 1, further including a pair of bearing units, each of said first and second longitudinally spaced flanges of said axle including an arcuate surface defined as a socket for receiving a respective one of said bearing units.

3. The axle structure for bicycles of claim 1, wherein said protrusions of said cylindrical housing define a number of channels therebetween adapted to guide any water penetrating into the housing along said channels to the bottom portion of said shell.

4. The axle structure for bicycles of claim 3 wherein, said cylindrical housing is formed from two identical half-shell pieces rigidly connected by fasteners.

5. The axle structure for bicycles of claim 3 wherein, said cylindrical housing comprises an integral one piece housing.

6. The axle structure for bicycles of claim 1, wherein said flange cup is provided with an aperture having a periphery with a reduced thickness portion, said adjusting cup is provided with an aperture having a periphery with a reduced thickness portion, and first and second washers adapted to be mounted upon the reduced thickness portions of the apertures of said flange cup and adjusting cup respectively.

* * * * *